Sept. 30, 1958
E. T. OAKES
2,853,961
SANDWICH MAKING MACHINE
Filed Jan. 25, 1955
3 Sheets-Sheet 1
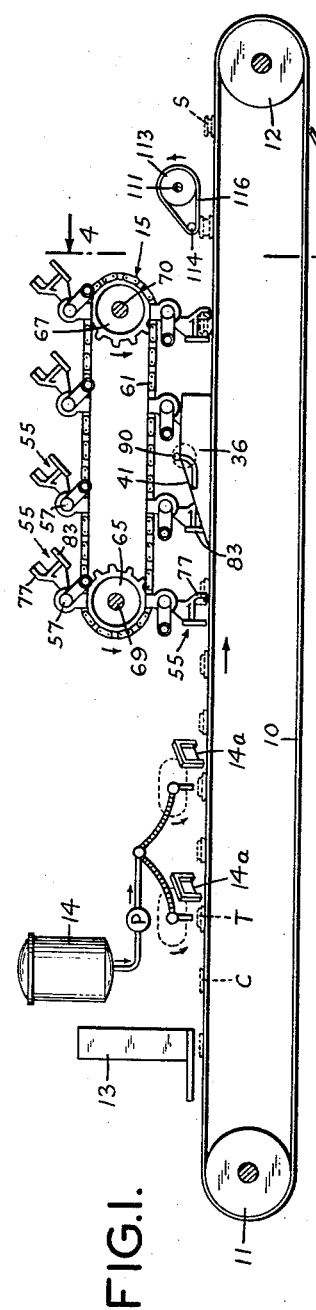
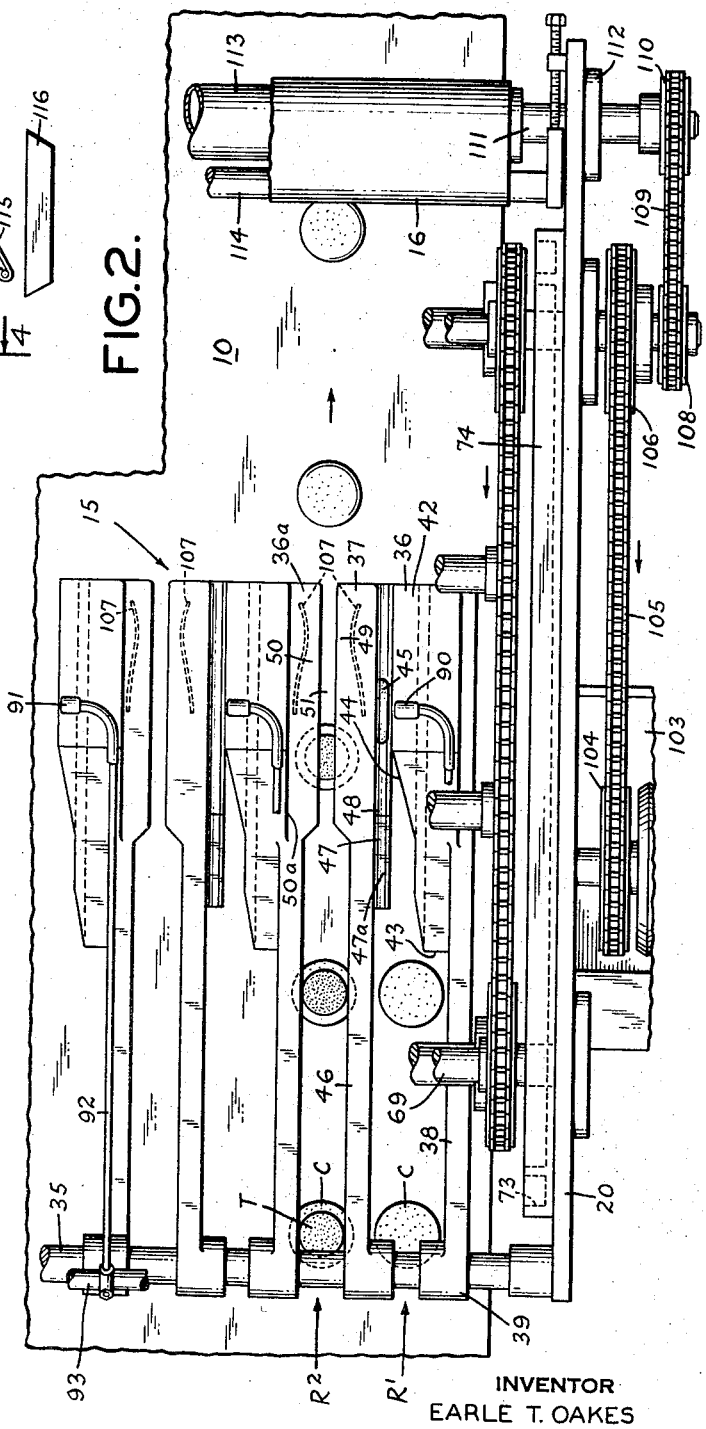
INVENTOR
EARLE T. OAKES
BY
HIS ATTORNEYS Sept. 30, 1958 E. T. OAKES 2,853,961
SANDWICH MAKING MACHINE
Filed Jan. 25, 1955 3 Sheets-Sheet 2

INVENTOR
EARLE T. OAKES
BY
HIS ATTORNEYS

Sept. 30, 1958 — E. T. OAKES — 2,853,961
SANDWICH MAKING MACHINE
Filed Jan. 25, 1955 — 3 Sheets-Sheet 3

INVENTOR
EARLE T. OAKES
BY
HIS ATTORNEYS

United States Patent Office 2,853,961
Patented Sept. 30, 1958

2,853,961

SANDWICH MAKING MACHINE

Earle T. Oakes, East Islip, N. Y., assignor to The E. T. Oakes Corporation, Islip, N. Y., a corporation of New York Application January 25, 1955, Serial No. 484,020

12 Claims. (Cl. 107—1)

This invention relates to improvements in sandwich making machines and it relates particularly to improvements in machines, generally of the kind disclosed in my copending U. S. application Ser. No. 440,409, filed June 30, 1954, now Patent No. 2,817,306, dated December 24, 1957, for making sandwich-type cookies, cakes, confections and the like, of the kind having cream, jelly, marshmallow, or similar fillings therein.

As pointed out in my copending application, the sandwich making machines used heretofore in the industry have been provided with two magazines spaced lengthwise of a conveyor for feeding rows of cookies, cakes and the like onto the conveyor in superposed relation. A depositing device applies a filling to the cookies placed on the conveyor by one magazine so that when the other cookies are deposited, they will, theoretically, fall on top of the filling and thereby complete the sandwich. These prior machines have not been entirely satisfactory because it has been difficult to maintain high production rates therewith due to the difficulty of keeping the two magazines loaded and also in preventing skips in the depositing of the cookies which usually results in smearing of the filling on the conveyor belt and other parts of the machine, necessitating frequent shutdowns for cleaning the machine.

The present invention includes a novel type of mechanism for receiving and inverting alternate cookies in transverse rows across the conveyor so that they can be placed accurately one on top of the other. The inverting device is so related to the remainder of the machine that only one magazine is required for supplying cakes to the conveyor. In this way, the problems of maintaining the magazine filled with cakes or cookies are materially decreased and skipping of cookies and smearing of the conveyor and the machine with filling are substantially completely eliminated whereby higher production rates and a better and more sanitary product are obtained.

For a better understanding of the present invention, reference may be had to the accompanying drawings in which:

Fig. 1 is a schematic view of a typical apparatus of the kind embodying the present invention;

Fig. 2 is a plan view of the cookie inverting apparatus forming a part of the sandwich making machine shown partly broken away to disclose details thereof;

Figure 3:
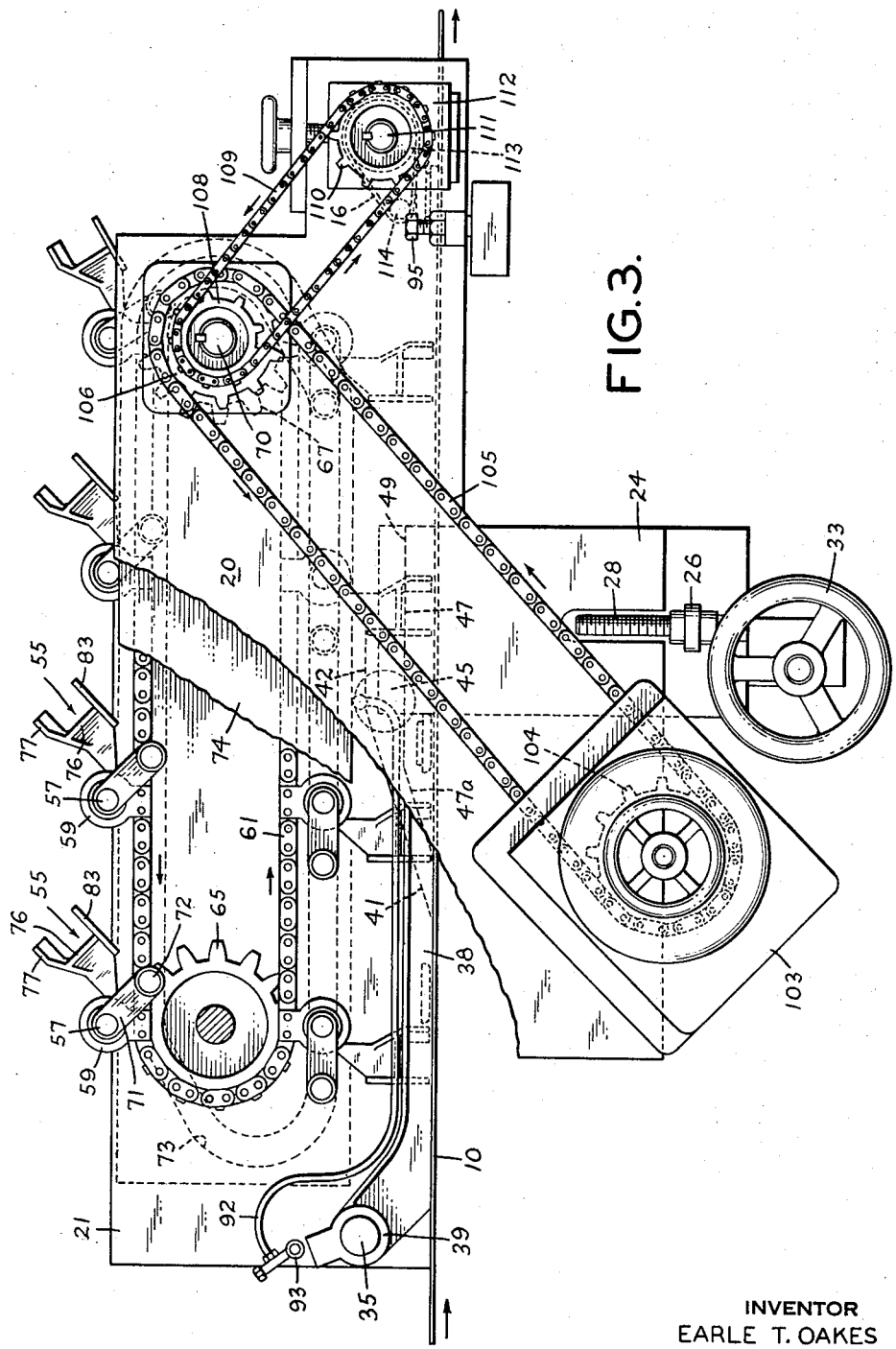
Fig. 3 is a view in side elevation of the cookie inverting device also shown partly in section and partly broken away to show details thereof.

As shown in Fig. 1 of the drawings, a typical sandwich machine embodying the present invention may include an endless conveyor 10 supported at its opposite ends by means of rollers 11 and 12 which are driven in any suitable way to advance the upper flight of the conveyor from left to right. Cooperating with the conveyor is a magazine 13 made up of a plurality of hoppers by means of which successive rows of cakes, cookies and the like, may be deposited transversely of the conveyor 10. The conveyor moves the cakes or cookies C beneath a depositor 14 which deposits a topping T or filler on all of the cakes in alternate rows extending lengthwise of the conveyor. Thus, as shown in Fig. 2, the cakes C in row $R^1$ do not receive a topping, while all of the cakes C in row $R^2$ receive a topping or filling T. The magazine 13 and the depositor 14 may, for example, be of the kind shown in my U. S. Patent No. 2,664,055, dated December 29, 1953. The patented machine includes orbitally movable depositing nozzles to deposit accurately a topping or a filling on the cakes fed in timed relation from the magazine 13. To assure clean severance of the topping from the nozzles of the depositor, cut-off wires 14a may be positioned transversely of the path of the nozzles to wipe against the ends of the nozzles at the end of the depositing stroke.

The rows of cakes $R^1$, $R^2$, etc, are moved along to a turn-over or inverting device 15 by means of which the cookies or cakes C in the row $R^1$ are successively turned over by rotating them about a side edge and placed in superimposed relation or approximately so, to the cakes C having the topping T thereon. The turn-over device is so arranged that the superimposed cakes are brought into accurate alignment and the upper untopped cookies are then dropped onto the topped cookies and passed beneath a pressing belt 16 where they are squeezed together to form the completed sandwiches S and then are discharged at the right-hand end of the conveyor 10.

Figure 4:
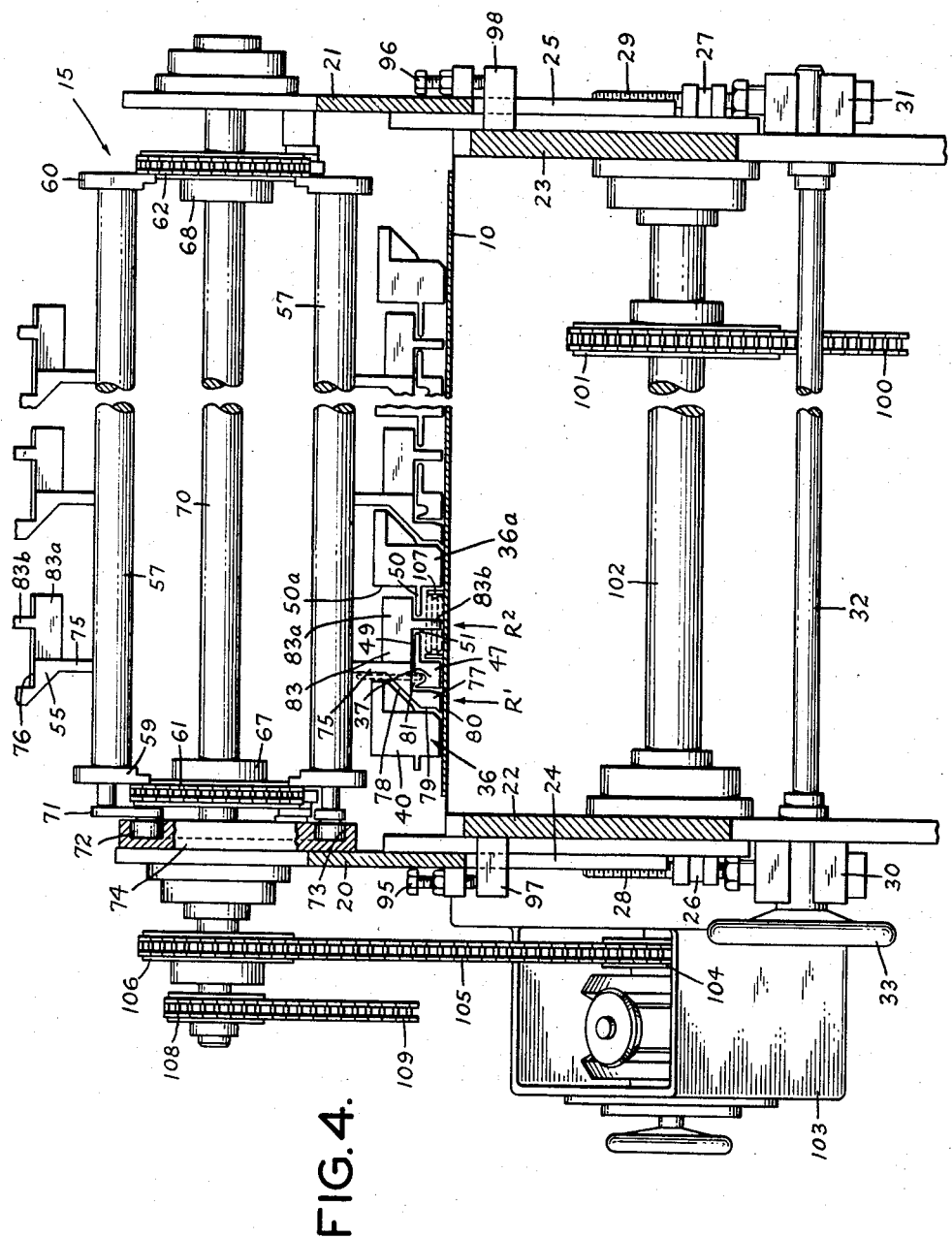
Fig. 4 is a view in vertical section through the sandwich making machine taken on line 4—4 of Fig. 1 and further partly broken away.

Having explained the general principles of operation of the sandwich making machine, reference may be had now to Figs. 2, 3 and 4, which disclose details of the inverting device. As shown in these figures, the inverting device 15 includes a pair of side plates 20 and 21 which are carried by the longitudinally extending side rails 22 and 23 of the machine frame. As indicated in Figs. 3 and 4, the side plates 20 and 21 have, near their mid-portions, downwardly extending members 24 and 25 slidably engaging the side rails 22 and 23. The members 24 and 25 are secured at their lower ends to the nuts 26 and 27 on the upwardly extending screw shafts 28 and 29 which are journaled for rotation in bearing boxes 30 and 31 fixed to the side rails 22 and 23. The screw shafts 28 and 29 are rotated by means of a transverse shaft 32 and a hand wheel 33 and intreposed gearing to slide the side plates 20 and 21 up and down for adjusting purposes, as will be explained hereinafter.

The side plates 20 and 21 carry at their leading ends a cross shaft 35 which serves to support a series of inverting elements 36, 37 and 36a in such position that they are in contact with the upper surface of the conveyor belt 10. The element 36 includes an elongated arm 38 having a boss 39 on its left-hand end which engages and is supported by the cross shaft 35. Near the trailing end of the inverting member 36 and projecting laterally from it toward the member 37 is a ramp or wedge member 40 having, as shown in dotted lines in Fig. 3, an upwardly and rearwardly inclined surface 41 terminating in a short, horizontal surface 42 near the rear end of the member 40. The leading end of the member 40 is relatively narrow and has a chisel-like edge 43 to engage beneath the leading edge of a cookie C carried by the conveyor as shown in Fig. 2. It also has a diverging lateral edge 44 thereon which tends to lift and tilt the cookie about its upper edge to bring it into the essentially vertical plane or position indicated at 45 in Figs. 2 and 3.

Inverting element 37 cooperates with the element 36 to aid in turning over and supporting the cookie after it has been inverted. To that end, the element 37 also has an elongated arm 46 thereon for connecting it to the shaft 35 and it also has a wedge-shaped member 47 of a maximum height less than the wedge member 40, which engages beneath the edge of the cookie and supports it during the inverting movement. The member 47 has an upwardly inclined surface 47a provided with a groove 48 in which the edge of the cookie is received. The upper surface of the member 37 is flattened and extended in width as at 49 to receive the cookie after it has been inverted. The next adjacent member 36a, corresponding to the member 36, is also provided with a laterally directed flange 50 spaced slightly from the flat surface 49 to provide a slot 51 therebetween and a vertical shoulder 50a at the opposite edge of the flange 50.

Inasmuch as the cookies C in row $R^1$ are moved upwardly out of engagement with the conveyor 10 during their inverting movement, means is provided for moving and bringing the inverted cookies into proper relation to the filled or topped cookies C in the row $R^2$. The means for advancing the cookies consists of a plurality of pushers 55, which are mounted on spaced, parallel, transverse shafts 57, rotatably carried by bushings 59 and 60 joined to the chains 61 and 62 at opposite ends of the shafts. The chains are supported at opposite ends by means of pairs of sprockets 65, 65, 67 and 68. The sprockets 65 and 65 are mounted on a shaft 69 journaled in the left-hand end of the side plates 21 and 22, while the sprockets 67 and 68 are mounted on the shaft 70 mounted rotatably in the opposite end of the plates.

Each shaft 57 is provided at one end with a crank 71 carrying a roller 72 at its end which is movable along a cam track 73 formed in a plate 74 carried by the side plate 20. The contour of the cam track 73 is such that the pushers 55 are rocked into a rearwardly inclined position at the point where they break contact with the cookies as the pushers start around the sprocket 108. This prevents the pushers from kicking the sandwiches forward as the pushers pick up speed as they go around the sprocket. The cam track 73 positions the pushers substantially vertically while they are moving along the lower part of their path or flight adjacent to the conveyor 10.

The pushers are of peculiar configuration in order to produce proper inversion of the cookies and proper alignment thereof. Thus, each pusher 55 has an arm 75 extending substantially radially from its supporting shaft 57, as shown in Fig. 4. Connected to the outer end of the arm 75 is a plate 76 substantially perpendicular to the axis of the arm 75. Mounted substantially perpendicular to the leading edge of the plate 76, that is, the right-hand edge, is pusher element 77 which, when viewed from the front as in Fig. 4, has an inclined left-hand edge 78 joined to a vertical edge 79 which, in turn, joins another outwardly diverging edge 80 corresponding to the contour of the undersurface of the inverting member or wedge 40. The opposite side of the element 77 has a reentrant recess 81 therein conforming generally to the maximum cross-section of the grooved wedge 47 on the inverting element 37. This shape or configuration of the element 77 enables it to engage behind a cookie, as shown in Fig. 3, pass between the inverting elements 36 and 37, and push the cookie up the ramps or inclined surfaces 41 and 47a.

Another pusher element is also formed on the trailing edge of the pushers, as best shown in Figs. 3 and 4. This element consists of a plate 83 fixed to the trailing edge of the plate 76 extending perpendicular to it and having a wide upper section 83a disposed above the plate 76 and a narrow tongue 83b disposed below the plate 76. As shown in Fig. 4, the wide section 83a is disposed above the flanges 49 and 50 so that it will engage the inverted cookie thereon, while the tongue 83b extends through the slot 51 and engages the cookie having the filling F thereon carried by the conveyor 10 so that they are advanced simultaneously to the right-hand end of the surfaces 49 and 50 where the inverted cookie is dropped onto the coated cookie. In this way, positive alignment of the cookies is assured because the spacing between the elements 36 and 37 and the position of the shoulder 50a is such that the cookies have little or no lateral movement as they are advanced into alignment.

While the inverting devices 36 and 37 will, in most cases, cause the uncoated cookie to fall into proper position on the surfaces 49 and 50, I have provided a series of nozzles 90, 91, etc. adjacent the top of the inverting elements 36, 36a, etc., which direct blasts of air laterally against the faces of the vertically disposed cookies and thereby blow them gently onto the horizontal surfaces 49 and 50 and against the shoulder 50a in a position to be engaged by the pusher member 83a. Air may be supplied to the nozzles 90 and 91 by means of conduits 92 connected to a cross pipe 93 carried by the side plates 20 and 21.

Proper spacing of the pushers with respect to the belt can be accomplished by means of the adjusting hand wheel 33 described above, which raises and lowers the side plates 20 and 21 and carries the other elements with them relative to the conveyor belt 10. Downward movement of the inverting mechanism may be limited by means of screws 95 and 96 carried by the side plates 20 and 21 and engaging lugs 97 and 98 on the side rails 22 and 23.

As shown in Fig. 4, the power for driving the inverting mechanism may be received from a motor-driven chain 100 which drives a sprocket 101 fixed to a cross shaft 102 journaled in the side rails 22 and 23. The chain 100 may be driven by a motor (not shown) that drives the conveyor 10. At the left-hand end of the shaft 102 is a differential 103 by means of which the pushers 55 may be timed properly to engage the cookies at the exact moment desired. A pocket 104 is driven by the differential 103 and a chain 105 connects the sprocket 104 with a drive sprocket 106 carried on the shaft 70 which drives the pusher members 55. The apron 10 and the chains carrying the pusher members 55 are driven from one common power source and it is only necessary to adjust the timing of the contact point where the pushers 55 engage the cookies. The pushers 55 actually travel at a fixed differential speed approximately 25% faster than the apron speed. The uncoated and inverted topping cookies are slightly retarded at the beginning of the ramp at 43, until the pushers catch up to them. Again they are slightly retarded when they leave this part of the ramp and assume the inverted position on platform 49. In the meantime, the iced cookie has proceeded to a point underneath and near the end of platform 49 where flexible restriction members such as spring steel guides 107 (Fig. 2) position the cake and retard its forward progress until the rear of the pushers 55 carrying the topping cookie engage them and carry them forward together. By this means, since the restraining guides do not reach over as far as the icing, in the case of icing deposited on the apron due to the absence of a base cake at that point, the icing passes straight along on the apron and the pushers only catch up to the point where the icing has been deposited and therefore they do not become fouled with icing from this source.

A small take-off sprocket 108 is also carried by the shaft 70 and drives by means of a chain 109 a sprocket 110 carried by a cross shaft 111 mounted in adjustable journal blocks 112 at the right-hand ends of the side plates 20 and 21. A roll 113 is mounted on the shaft 11 and carries and drives the presser belt 16 for squeezing assembled cookies together to form the completed sandwich. A small rod or roller 114 engages the presser belt 16 to maintain its lower flight inclined at a small angle to the horizontal. Tensioning of the belt 16 and adjustment of it relative to the belt 10 is accomplished by up and down movement of the journal blocks 112.

Having described a typical apparatus, the operation of the device will be briefly summarized. The rows R¹, R², etc. of cookies are deposited by the magazine 13 on the conveyor belt which conducts them beneath the depositor 14 where topping or filling is deposited on alternate rows of cookies, for example, row R², but not row R¹. The cookies are advanced by the conveyor belt 10 into engagement with the chisel-like edge 43 of the inverting member 40 where the edge of the cookie is raised and it is pushed against the inclined grooved member 47. At this time, the pushing element 77 of one of the pusher members 55 moves into engagement with a cookie of row R¹ so that the cookie is advanced up the inclined surface 41 and is rocked about the edge in engagement in the groove 48 into the vertical position 45 shown in Fig. 2. The air blast from the nozzle 90 completes the inversion of the cookie and slides it laterally onto the surfaces 49, 50 against the shoulder 50a in a position substantially overlying a cookie C having a topping T thereon carried by the conveyor belt. The two superimposed cookies shortly thereafter will be engaged by the pusher 83 so that they are brought into accurate alignment and advanced somewhat faster than the conveyor belt 10 to the right-hand ends of the inverting devices 36 and 37 where the inverted cookie drops onto the topped or filled cookie. The conveyor belt 10 then carries the assembled sandwich beneath the belt 16 where the cookies are squeezed together to distribute the filling uniformly between them and are then discharged for packaging or such other treatment as may be desired.

The above-described apparatus has the advantage of enabling all of the compartments of the magazine 13 to be filled with cookies in the same relative positions so that no especial care need be taken by the operator to modify the positions of the cookies. In other words, they are all taken from the baking oven, inverted and placed in the several hoppers of the magazine.

Another advantage of the machine is that failure of the operator to keep the magazines filled will not necessarily cause smearing and shutting down of the machine for cleaning, if a hopper becomes empty. If a cookie that is to be topped, is skipped, the topping will be applied to the conveyor belt but this topping is removed by a scraper blade extending across the belt 10 as it begins its return journey on the lower flight. The blade 115 scrapes the entire width of the conveyor, thereby keeping it clean. The icing removed by the blade is received in a pan or other receptacle 116 beneath the belt 10. If desired, other suitable belt washing or wiping mechanisms can be provided to clean the belt 10 continuously as it advances. If a covering cookie is skipped, the partially made sandwich is removed at the discharge end of the conveyor without smearing the machine at all.

Another advantage of the new apparatus is that it enables cookies of different types to be assembled into sandwiches. Thus, the cookies in alternate magazines may be of different flavors or colors so that they can be assembled to produce multiple colored or multiple flavored products.

Another important feature of the present machine is that it has only one set of magazines to be replenished. For this reason, it can be supplied either by an operator directly from the baking oven or, if desired, by automatic machinery, without the intervention of the operator so that a production line can be set up for the manufacture of the sandwiches.

It will be understood that the sandwich making machine may be made in appropriate sizes to handle various types of cookies, cakes and the like, and that it can be suitably modified to handle many different kinds of sandwich materials. Accordingly, the form of the invention described herein should be considered as illustrative and not as limiting the scope of the following claims.

I claim:

1. A machine for making sandwiches, comprising movable conveying means, for receiving articles in at least two rows extending in the direction of movement of said conveying means, the articles in one of said rows having a sandwich filling thereon, means overlying the conveying means in the path of the articles in the other row for engaging the articles in said other row, successively inverting them and moving them laterally into superimposed relation to the articles in said one row, and means for bringing said superimposed articles together with the filling interposed between them.

2. A machine for making sandwiches, comprising movable conveying means for receiving articles in at least two rows extending in the direction of movement of said conveying means, the articles in one of said rows having a sandwich filling thereon, means overlying the conveying means in the path of the articles in the other row for engaging a lateral edge portion of each article in said other row and lifting and turning the articles about their opposite lateral edges to invert them and move them successively into superimposed relation to the articles in said one row, and means for bringing said superimposed articles together with the filling interposed between them.

3. A machine for making sandwiches, comprising movable conveying means for receiving articles in at least two rows extending in the direction of movement of said conveying means, the articles in one of said rows having a sandwich filling thereon, a member having a sharp leading edge engageable with successive articles in the other row beneath the side thereof away from said one row and an upwardly and rearwardly inclined surface for tilting each article around the edge thereof adjacent to said one row and inverting and displacing them laterally into superimposed relation to the articles in said one row, and means for bringing said superimposed articles together with the filling interposed between them.

4. A machine for making sandwiches, comprising movable conveying means for receiving articles in at least two rows extending in the direction of movement of said conveying means, the articles in one of said rows having a sandwich filling thereon, a pair of inverting members extending lengthwise of said conveying means, each inverting member having a sharp leading edge facing toward and engageable with the lateral edge portions of articles in the other row and an upwardly and rearwardly inclined surface, one of said inverting members being higher than the other and having a lateral edge converging toward said other inverting member to lift each article and tilt it around the edge portion in engagement with said other wedge-shaped member to invert the articles successively, means to move said articles along said inverting members and move them laterally when inverted into superimposed relation to the articles in said one row, and means for bringing said superimposed articles together with the filling interposed between them.

5. The machine set forth in claim 4, in which the means to move the articles along said inverting members comprises a series of pusher members mounted for movement lengthwise of said inverting members and above said conveying means, and means for moving said pusher members rearwardly of said inverting members.

6. The machine set forth in claim 4, in which the means for moving said articles laterally comprises a nozzle and means to supply air under pressure to said nozzle to direct a blast of air against the tilted articles.

7. The machine set forth in claim 4, comprising guide means on said inverting members for aligning the inverted articles with the articles in said one row transversely of their direction of movement, and means for engaging and moving them in the direction of movement of the conveying means to align them in a direction lengthwise of said conveying means and thereby bring them into accurately superimposed relation.

8. A device for making sandwiches and the like comprising conveying means for receiving articles in at least two rows extending lengthwise of said conveying means, an inclined member overlying the conveying means and having a sharp leading edge facing toward and successively engageable beneath one edge portion of each article in one of said rows to one side of its center to lift and tilt the article about the other edge adjacent to the other row, first pushing means overlying said conveying means and engageable with the articles in said one row to push them along said inclined member and invert them, and second pushing means engageable with the articles in said other row and the inverted articles to bring them into alignment.

9. The device set forth in claim 8, comprising air blast means adjacent to said inclined member for blowing said tilted articles over into an inverted position.

10. The device set forth in claim 8, in which said pushing means are mounted for movement in the direction of movement of said conveying means and are movable at a higher linear speed.

11. The device set forth in claim 8, in which said first and second pushing means are spaced apart and successively engage each article in said one row to invert it and thereafter move it into alignment with corresponding articles in said other row.

12. The device set forth in claim 8, comprising a guide member for engaging said other lateral edge portion of each article in said one row to restrain it against lateral movement as said inclined member lifts and turns the article about said other edge and supporting means overlying the conveying means to support the inverted articles in spaced superimposed relation to the articles in said other row, said second pushing means acting to push the inverted articles off said means to support them into covering relation to the filling on the articles in said other row.

References Cited in the file of this patent

UNITED STATES PATENTS

| | | |
|---|---|---|
| 1,029,357 | Gage | June 11, 1912 |
| 1,575,207 | Hungerford | Mar. 2, 1926 |
| 1,973,195 | Ankcorn | Sept. 11, 1934 |
| 2,348,400 | Manspeaker | May 9, 1944 |
| 2,349,579 | Litty | May 23, 1944 |
| 2,391,937 | Arvidson | Jan. 1, 1946 |